(12) United States Patent
Ko et al.

(10) Patent No.: US 7,512,528 B2
(45) Date of Patent: Mar. 31, 2009

(54) METHOD OF SIMULATING MOVEMENT OF CLOTH AND COMPUTER READABLE MEDIA FOR THE SAME

(75) Inventors: Hyeong-Seok Ko, Gyeonggi-do (KR); Kwang-Jin Choi, Seoul (KR)

(73) Assignee: FXGear Inc., Seoul (KR)

( * ) Notice: Subject to any disclaimer, the term of this patent is extended or adjusted under 35 U.S.C. 154(b) by 0 days.

(21) Appl. No.: 11/652,768

(22) Filed: Jan. 12, 2007

(65) Prior Publication Data

US 2007/0118343 A1    May 24, 2007

Related U.S. Application Data

(63) Continuation of application No. 10/608,756, filed on Jun. 27, 2003, now abandoned.

(30) Foreign Application Priority Data

Jan. 10, 2003    (KR)    .............. 10-2003-1614

(51) Int. Cl.
   *G06G 7/48*    (2006.01)
(52) U.S. Cl. .............................. 703/6; 703/2
(58) Field of Classification Search ............. 703/2, 703/6
   See application file for complete search history.

(56) References Cited

U.S. PATENT DOCUMENTS 6,869,169 B2    3/2005    Cabal et al. ................ 347/65

OTHER PUBLICATIONS

Kinii et al, "Singularity and Theoretical Modeling and Animation of Garment Wrinkle Animation Process", The Visual Computer, vol. 6, pp. 326-336, 1990.*

Eischen et al. "Finite-element modeling and control of flexible fabric parts". *IEEE Computer Graphics and Applications*, pp. 71-80, Sep. 1996.

Baraff et al. "Large steps in cloth simulation". *SIGGRAPH 98*, Computer Graphics Proceedings, Annual Conferences Series, Orlando, Jul. 19-24, 1998.

Volino et al. "Implementing fast cloth stimulation with collision response". Proceedings of the International Conference on Computer Graphics, 2000.

(Continued)

*Primary Examiner*—Paul L Rodriguez
*Assistant Examiner*—Mary C Jacob
(74) *Attorney, Agent, or Firm*—Hamre, Schumann, Mueller & Larson, P.C.

(57) ABSTRACT

A method of simulating the movement of cloth and a computer-readable medium storing a program which executes the method of simulating the movement of cloth, wherein cloth deformation by compressive force is simulated by an immediate buckling model when the compressive force is applied to two extremities of a deformation unit which models the cloth, cloth deformation by stretching is simulated by a spring model, and hysteresis phenomenon of cloth is simulated by using spring-slips for modeling. The immediate buckling model is based on a model of the present invention in which a deformation unit is not contracted by compressive force and generates an immediate bending deformation. As for the compressive force and stretching, simulation is implemented by separate models, hysteresis phenomenon of cloth is simulated by use of spring-clips for modeling, whereby cloth characteristics can be well reflected and the buckling instability of cloth caused by compressive force can be solved, thereby increasing the simulation speed.

4 Claims, 11 Drawing Sheets

OTHER PUBLICATIONS

Choi et al. "Stable but responsive cloth". *ACM Transactions on Graphics, Proceeding of ACM SIGGRAPH 2002*, vol. 21, No. 3, Jul. 2002.

Leaf et al. "The Initial Bending Behaviour of Plain-woven Fabrics". *Journal of the Textile Institute*, pp. 419-427, vol. 84, Mar. 1993.

Breen et al, "Predicting the Drape of Woven Cloth Using Interacting Particles", Proceedings of the 21st Annual Conference on Computer Graphics and Interactive Techniques, pp. 365-375, 1994.

Schmidt, "An Investigation of Space Suit Mobility With Applications to EVA Operations", PhD Thesis Summary, Massachusetts Institute of Technology, Aug. 2001.

Kang et al., "Complex Deformable Objects in Virtual Reality", VRST '02, Hong Kong, Nov. 11-13, 2002.

Ng et al., "Computer Graphics Techniques for Modeling Cloth", Computer Graphics in Textiles and Apparel, Sep. 1996.

Hadap et al., "Animating Wrinkles on Clothes", Proceedings, Visualilzation '99 24-29 Oct. 19.

Comer et al, "Deflections of an Inflated Circular-Cylindrical Cantilever Beam", AIAA Journal, vol. 1, No. 7, pp. 1652-1655, Jul. 1963.

Main et al., "Beam Type Bending of Space-Based Inflated Membrane Structures", Journal of Aerospace Engineering, vol. 8, No. 2, pp. 120-125, Apr. 1995.

* cited by examiner

METHOD OF SIMULATING MOVEMENT OF CLOTH AND COMPUTER READABLE MEDIA FOR THE SAME

This application is a continuation of U.S. application Ser. No. 10/608,756, which application is incorporated herewith by reference.

FIELD OF THE INVENTION

The present invention relates to a method for simulating the movement of cloth and computer-readable media that stores a program which executes the method, and more particularly to an immediate buckling model, hysteresis model, and cloth simulation method based on the invented. models, and computer-readable media storing the program which executes the invented simulation method. Deformation boy compressive force applied at two extremities of the deformation unit which models cloth is simulated by an immediate buckling model that is immediately bent without contraction. Deformation by stretching force is simulated by -a spring .model, while cloth hysteresis characteristics are modeled by using new hysteresis models called "Kwang-Jin Choi and Hyeong-Seok Ko Discrete Hysteresis Model" (hereinafter referred to as Choi-Ko Discrete Hdysteresis Model) and "Kwang-Jin Choi and -Hyeong-Seok Ko Continuous Hysteresis Model" (hereinafter referred to as Choi-Ko Continuous Hysteresis Model), thereby improving the simulation of the movement of cloth and solving the buckling instability problem.

BACKGROUND OF THE INVENTION

In general, a thin structure is characterized as having weak resistance to bending force and strong resistance to stretching force, such that movement of a thin structure is solved by a stiff equation (a type of differential equation). When compressive force is applied to a thin structure, contraction occurs. As the compressive force is increased to pass a critical point, the thin structure is vertically bent, also known as buckling. Buckling is a deformation which occurs abruptly so that it is a very unstable reaction. Therefore, the simulation of that kind of buckling results in a divergence problem in differential equations for simulating the movement of cloth.

The buckling instability refers to the contrast of the decrease in compressive force and increase in bending deformation. This structural instability makes the system matrix extremely ill-conditioned or indefinite, and in a case where the time period of the simulation steps is increased, the system matrix becomes divergent. In conventional simulations of the movement of cloth, a model in which the instability of buckling exists is used such that it is very difficult to simulate a phenomenon of wrinkles (buckling) forming on the surface of the cloth.

The buckling instability problem arises not from the stiff equation itself but from the structural instability of the cloth. Therefore, simply employing an implicit method cannot solve the problem. Resolution of the buckling instability problem was conventionally sought by adding a damping term to a system matrix. However, although the addition of the damping term can stabilize the system, it obstructs the naturalness of the movement of the cloth. In other words, the damping force prevents formation of wrinkles on the cloth's surface, and prevents wrinkles from disappearing. Hence, a simple addition of a damping term is not desirable to simulate the movement of cloth.

Furthermore, a continuous body model used in the past brought forth an undesirable result due to the following reasons. A coarse discretization should be allowed to guarantee a reasonable performance in computer graphic applications. However, a continuous body model requires a very fine mesh in order to simulate large deformation of cloth. Therefore, a reasonable processing speed cannot be obtained. Another drawback is that the continuous body model cannot properly deal with the divergence derived from buckling, thereby requiring additional calculations. [Eischen et al. 1996] uses a non-linear shell model for cloth simulation and performs a finite element analysis to simulate buckling. However, great care and cautious measures have to be undertaken such as arc length control to prevent divergence due to the non-linearity of the load-deflection curve or the singularity of the instantaneous stiffness matrix caused by buckling.

In [Baraff and Witkin 1998], a system of connected triangles was proposed as a model. The in-plane deformation energy of each triangle is derived from the continuous mechanism. The bending deformation is based on the angle between adjacent triangles. Therefore, the bending deformation and the in-plane deformation are modelled independently, which allows a large bending deformation between the-triangles regardless of the in-plane rigidity of each triangle, thereby resolving the drawback of the continuous body model. However, the buckling instability still remains in this model because each triangle is modeled as an almost incompressible material and the bending rigidity between triangles is very weak.

Still furthermore, in order to simulate the hysteresis characteristics of the movement of cloth, the results of measuring the hysteresis characteristics of the cloth have been directly used. However, a hysteretic response curve obtained by the measurement can be applied only when a curve change during the measurement and a curve change during the simulation are the same, such that it is not generally appropriate for dynamic simulation. In other words, a hysteretic response curve is a function of the entire curvature history, such that it is not reasonable to simulate by measuring the curve instead of by constructing a physical model for the hysteresis characteristics.

SUMMARY OF THE INVENTION

It is an object of the present invention to provide a method for simulating the movement of cloth realistically without the requirement of very fine meshing and short simulation intervals by using a model without the buckling instability.

It is another object of the present invention to provide a method for simulating the movement of cloth and computer-readable media storing a program which executes the method to accurately express the characteristics of the movement of cloth and to achieve a fast simulating speed by solving the buckling instability.

DETAILED DESCRIPTION OF THE INVENTION

In order to accomplish the aforementioned objects, the present invention proposes to use the immediate buckling model, the "Choi-Ko Discrete Hysteresis Model" and the "Choi-Ko Continuous Hysteresis Model". The immediate buckling model comprises deformation units which model cloth, wherein the deformation unit is bent immediately without contraction when compressive force is applied to two extremities of the deformation unit.

The hysteresis phenomenon of cloth is modeled by using finite numbers of spring-slip units in the "Choi-Ko Discrete Hysteresis Model" which is used for simulating the hysteresis characteristics between the curvature and moment. The hysteresis phenomenon of cloth is also modeled by using infinite numbers of spring-slip units in the "Choi-Ko Continuous Hysteresis Model" which is used for simulating the hysteresis phenomenon between curvature and moment more realistically.

The spring model simulates the deformation of cloth when stretching force is applied to both extremities of the deformation unit (when stretching force is applied to the cloth). Therefore, the movement of cloth in relation to compression and stretching that react on the cloth will be analyzed by using models respectively appropriate thereto.

(Analysis of Bending Deformation by Immediate Buckling Model)

In the present invention, when compressive force is applied to cloth, an immediate buckling model (which does not resist to compressive force and does not shrink but bends immediately right after the application of the force) is used to simulate the bending deformation of the cloth. The bending deformation energy accumulated on the cloth can be calculated by estimating the shape of the deformed cloth.

Figure 1:
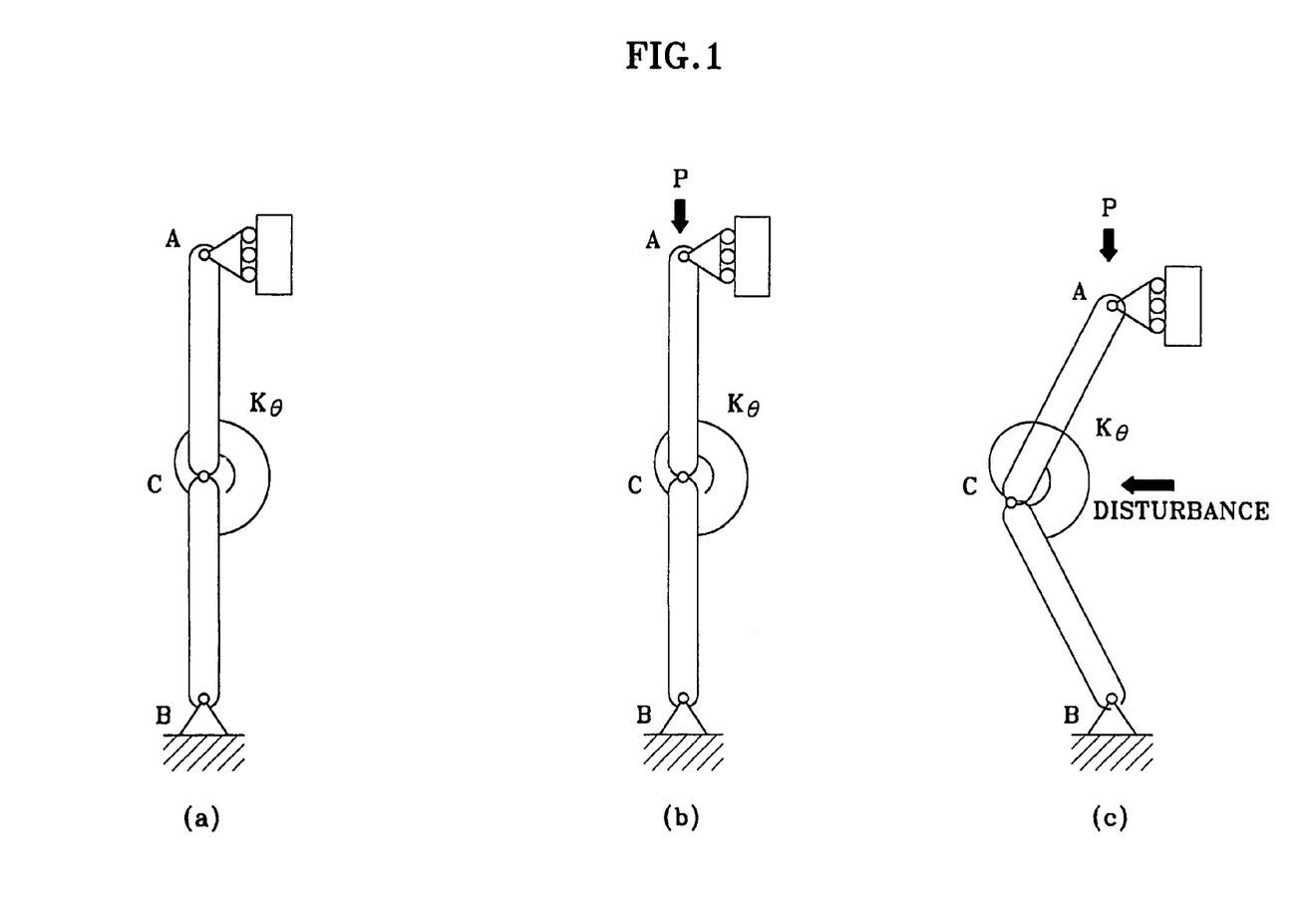
FIG. 1 is a drawing for illustrating a buckling phenomenon of a rigid material.
Figure 2:
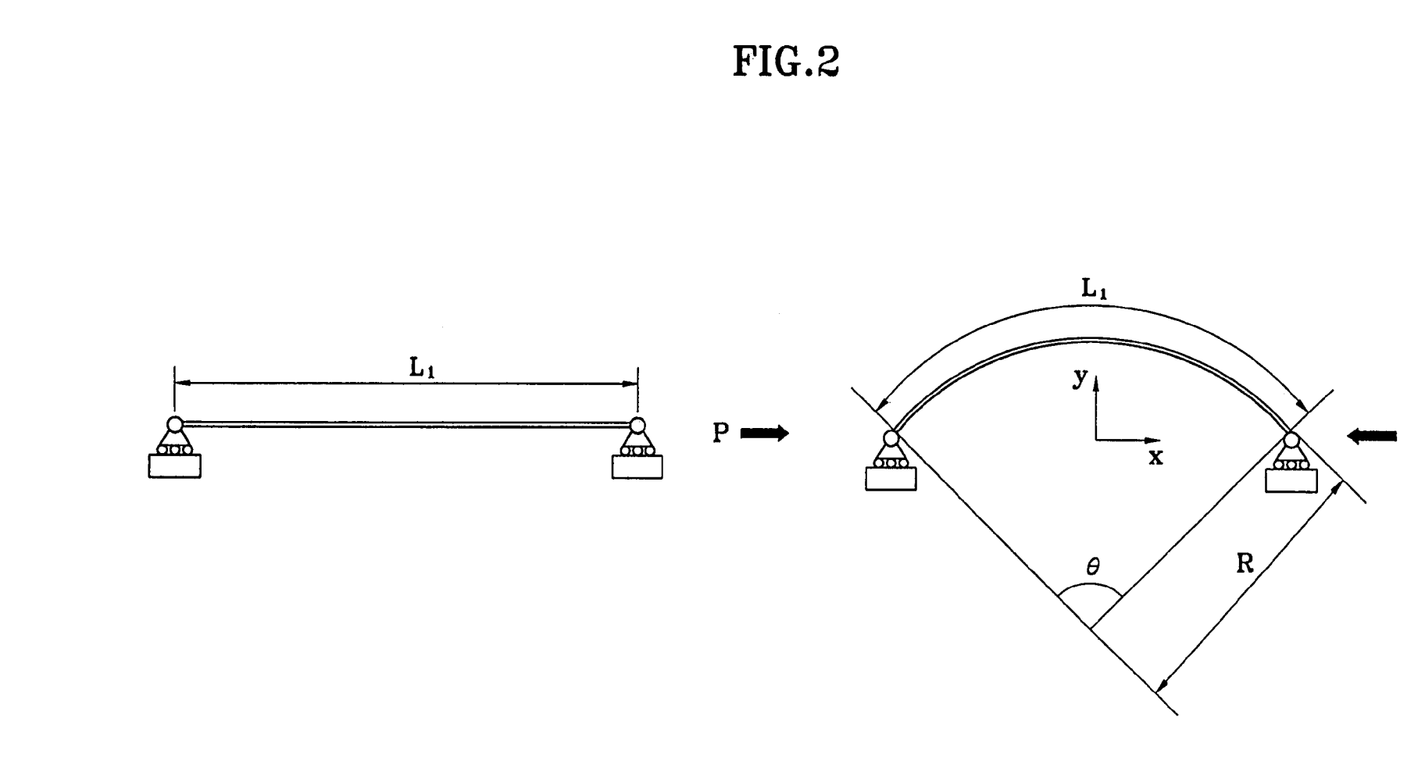
FIG. 2 is a drawing approximating a bending deformation of cloth according to an immediate buckling model.

Referring to FIG. 2, the process of obtaining deformation energy in relation to the bending deformation of cloth caused by the compressive force will be described below. According to the immediate buckling model illustrated in FIG. 2, the region of a predetermined deformation unit of cloth is modeled as a straight beam having no surface area and also a plate having a surface area, which will be described later.

As illustrated in FIG. 2, prior to buckling before compressive force is applied, the predetermined deformation unit is a straight beam of length L1. After buckling, the beam eventually reaches a stable equilibrium state (bent state). For example, in the present invention, the equilibrium shape is approximated as a circular arc with arc length L1. In other words, there is no contractive deformation in this immediate buckling model. That is, only bent deformation occurs. The bending deformation energy can be calculated by estimating the shape of the deformation unit using the following equation:

$$E = \frac{1}{2}\int_0^{L_1} MK dx \quad (1)$$

Where, M is the bending moment and K is the curvature. If it is assumed that the relationship between the curvature and bending moment is linear ($M=k_b K$), the bending deformation energy can be obtained by the following equation. A non-linear-case will be described later.

$$E = \frac{1}{2}K_b L_1 K^2 \quad (2)$$

Where, $K_b$ is the flexural rigidity.

Since the arc length of the beam is the same as that of the initial straight length $L_1$ of the beam, the curvature K can be expressed solely in terms of the distance ($|x_{ij1}|$) between the two extremities of the beam as follows:

$$K = \frac{2}{L_1}\text{sinc}^{-1}\left(\frac{|x_{ij1}|}{L_1}\right), \ \text{sinc}(x) = \frac{\sin x}{x} \quad (3)$$

The force vector is derived as, $$f_i = -\frac{dE}{dx_i} = k_b KL_1 \frac{dK}{d|x_{ij1}|}\frac{x_{ij1}}{|x_{ij1}|} = k_b KL_1\left(\frac{d|x_{ij1}|}{dK}\right)^{-1}\frac{x_{ij1}}{|x_{ij1}|} \quad (4)$$

$$= k_b K^2\left(\cos\frac{KL_1}{2} - \text{sinc}\left(\frac{KL_1}{2}\right)\right)^{-1}\frac{x_{ij1}}{|x_{ij1}|} \quad (5)$$

$$= f_b(|x_{ij1}|)\frac{x_{ij1}}{|x_{ij1}|} \quad (6)$$

Figure 5:
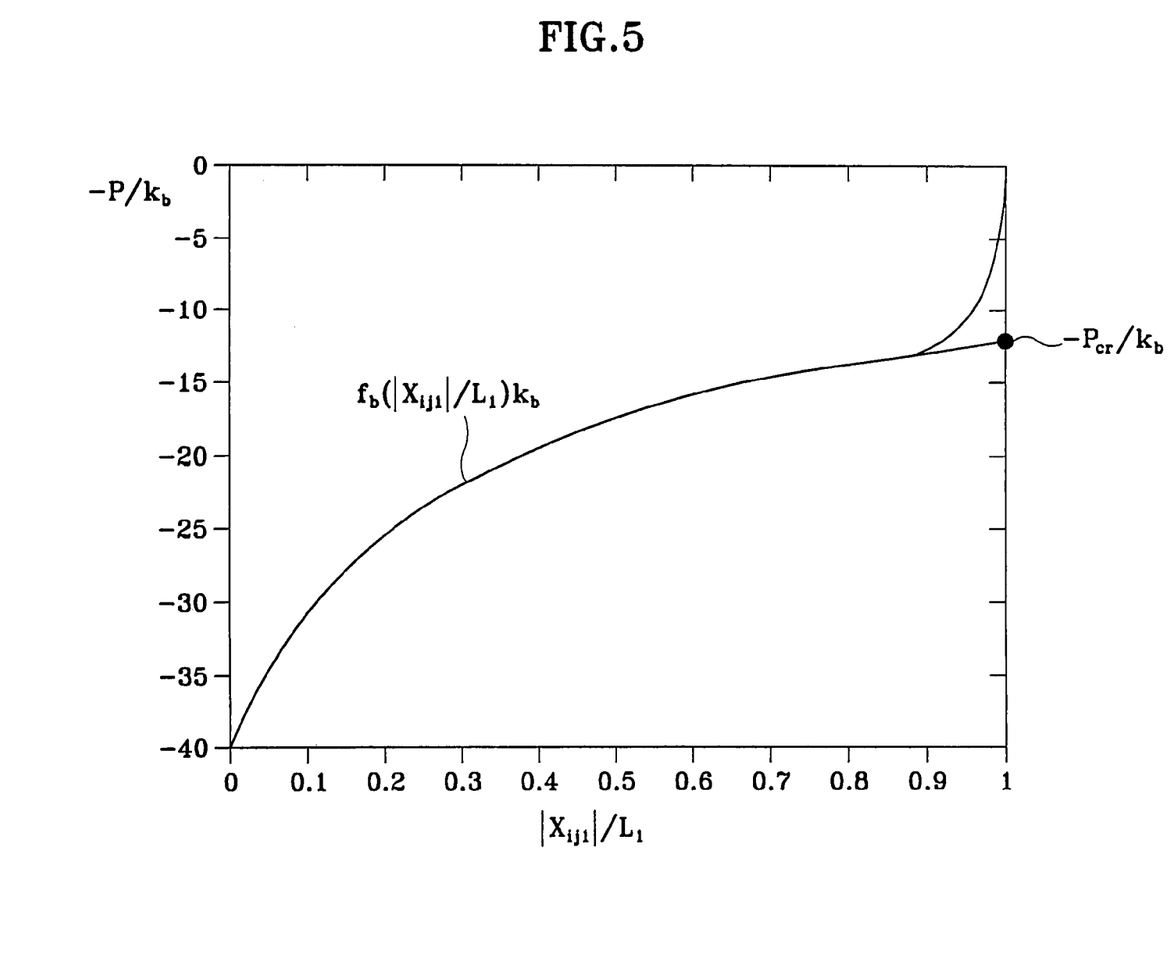
FIG. 5 is a graph for illustrating the distance between particles positioned: at two extremities of a deformation unit in relation to the compressive force in an immediate buckling model.
Figure 6:
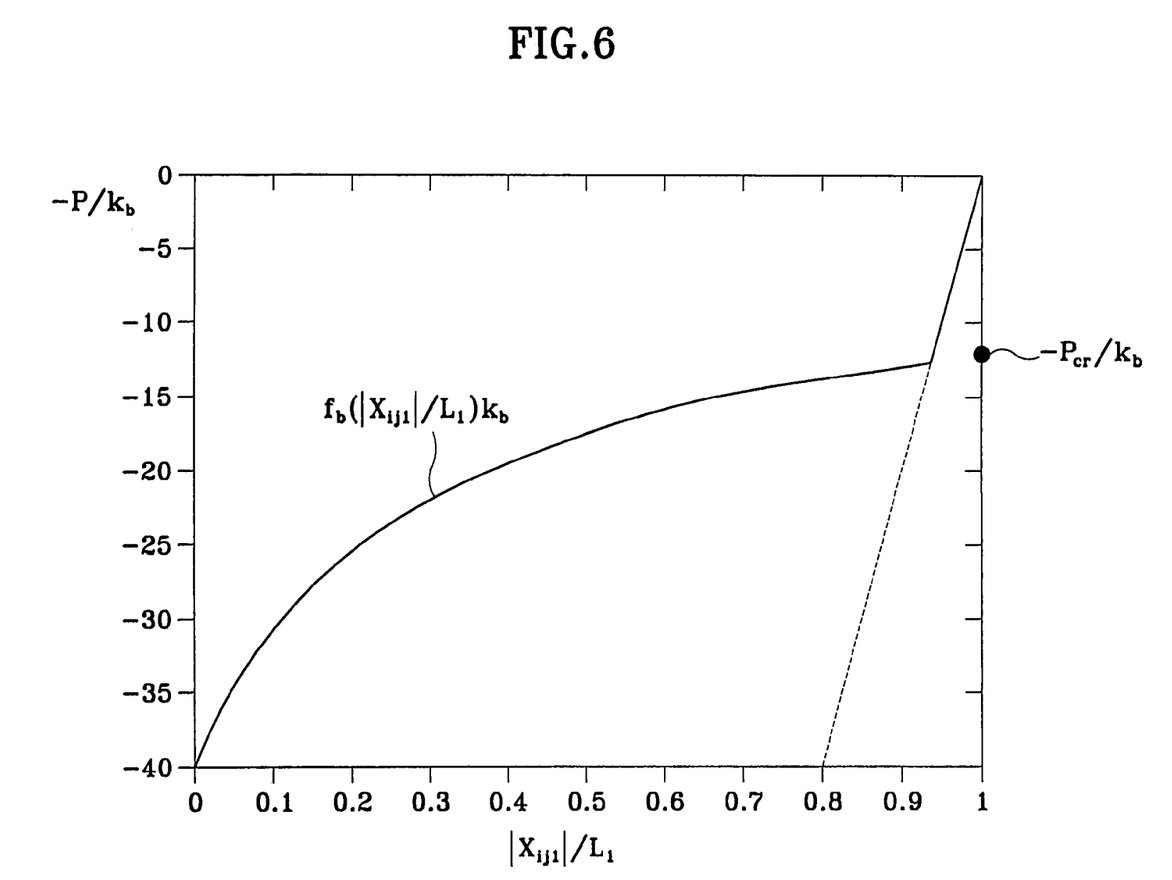
FIG. 6 is an approximate graph for illustrating the distance between particles positioned at two extremities of deformation unit relative to the compressive force at an immediate buckling model.

FIG. 5 depicts a relationship between the force vector (compressive force) and the distance between the two extremities of the deformation unit. As illustrated in FIG. 5, since the immediate buckling model is used in the present invention, when the compressive force is applied to cloth, the cloth starts to buckle at the onset of applying the force (immediately bent without contractive, deformation). Then, when compressive force exceeding a critical value (Pcr) is applied, a sizable amount of deflection (buckling) occurs. However, in order to simplify the relationship, deformation occurring below the critical value is approximated as a straight line as shown in FIG. 6. In other words, $$f_b^* = \begin{cases} c_b(|x_{ij1}| - L_1), & f_b < c_b(|x_{ij1}| - L_1) \\ f_b, & \text{otherwise} \end{cases}$$

Where, $C_b$ is an arbitrarily selected constant. Although the curvature is approximated as described above, there is no significant difference in the results. The Jacobian matrix of the force vector thus described is derived as $$\frac{df_i}{dx_i} = \frac{df_b^*}{d|x_{ij1}|}\frac{x_{ij1}x_{ij1}^T}{x_{ij1}^T x_{ij1}} + \frac{f_b^*}{|x_{ij1}|}\left(I - \frac{x_{ij1}x_{ij1}^T}{x_{ij1}^T x_{ij1}}\right) \quad (7)$$

In the above equation, $$\frac{df_b^*}{d|x_{ij1}|}$$

is always positive, but $$\frac{f_b^*}{|x_{ij1}|}$$

is always negative, such that there is a possibility that the second term of the equation could cause a singularity to the system matrix. Therefore, the second term is dropped. The Jacobian matrix without the negative term, obtained through the above-mentioned procedures, is the final result for analyzing the bending deformation of the cloth using the immediate buckling model.

Figure 3:
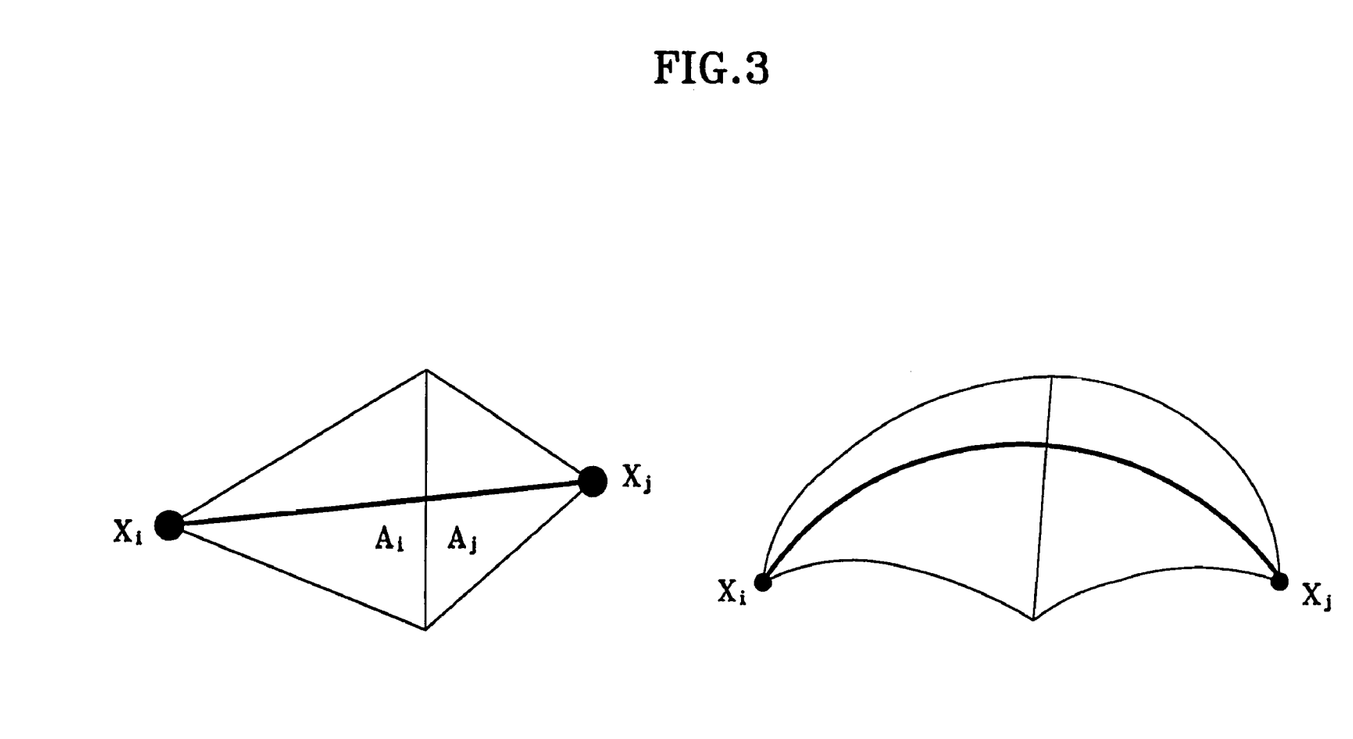
FIG. 3 is another drawing approximating the bending deformation of cloth according to an immediate buckling model.
Figure 4:
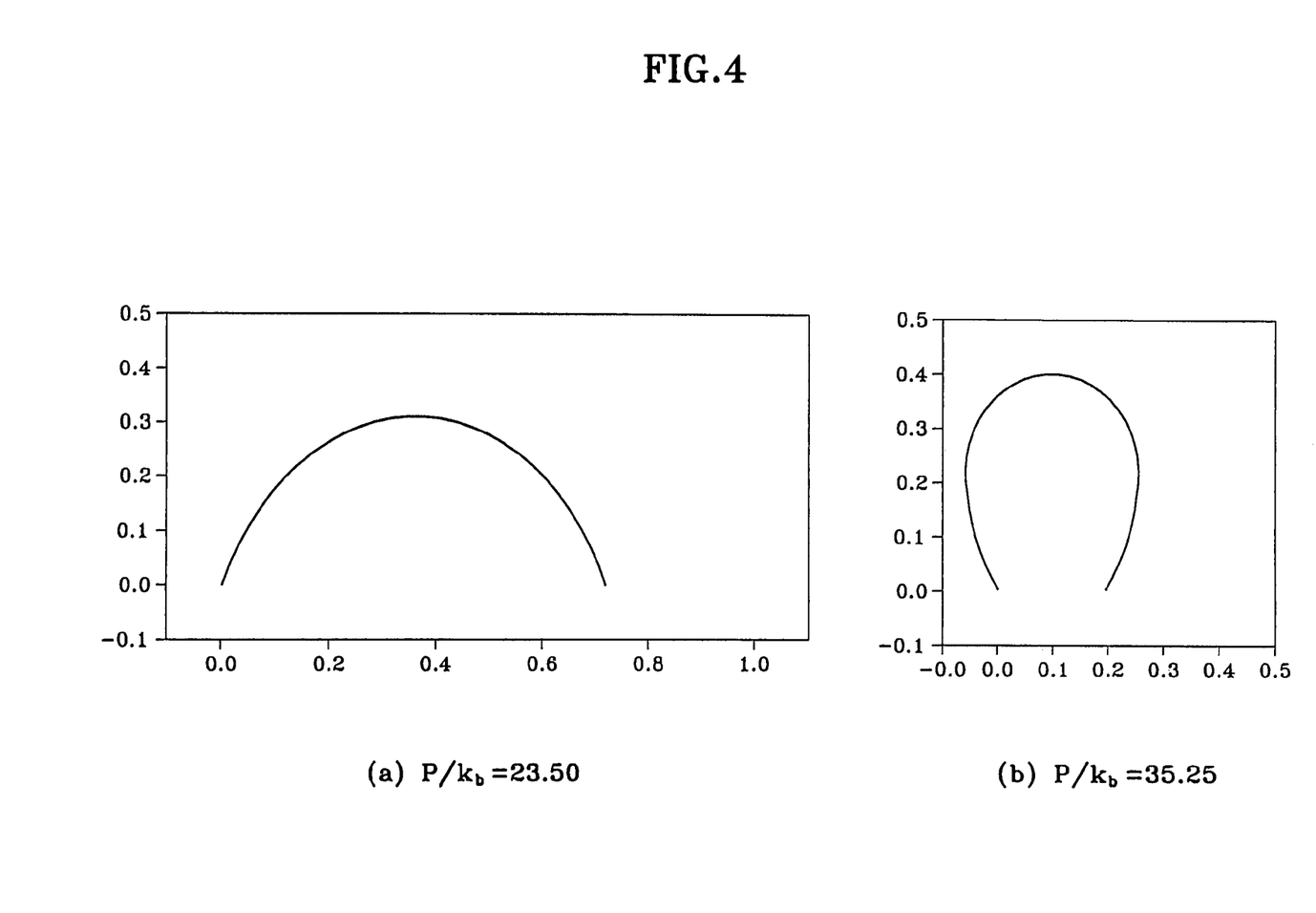
FIG. 4 is an-example of cloth deformation in an equilibrium state.

Although in the above-mentioned embodiment, the region at the two extremities of a predetermined deformation unit of the cloth is modeled as a beam having no surface area. The region can be modeled as a plate having a surface area. If the region is modeled as a triangular plate as shown in FIG. 3, the bending deformation energy can be calculated as follows:

$$E = \frac{1}{2}\int_{A_i \cup A_j} MK da = \frac{1}{2}k_b(A_i + A_j)K^2 \quad (8)$$

Where $A_i$ and $A_j$ respectively define areas of triangles. In this case, the force vector can be obtained as the following equations.

$$f_i = -\frac{dE}{dx_i} = k_b K(A_i + A_j)\frac{dK}{d|x_{ij1}|}\frac{x_{ij1}}{|x_{ij1}|} \quad (9)$$

$$= k_b K(A_i + A_j)\left(\frac{d|x_{ij1}|}{dK}\right)^{-1}\frac{x_{ij1}}{|x_{ij1}|}$$

$$= \frac{K_b}{L_1}(A_i + A_j)K^2\left(\cos\frac{KL_1}{2} - \text{sinc}\left(\frac{KL_1}{2}\right)\right)^{-1}\frac{x_{ij1}}{|x_{ij1}|}$$

Procedures hereafter are the same as those of the beats, except that in this case, the geometrical shape of the unit at an equilibrium state is like a cylinder. In the above embodiment, although it is assumed that a stable structure at the, equilibrium state is an arc or cylindrical shape, other shapes may be used, since the simulation results are slightly affected by the shape of the unit at an equilibrium.

(Bending Deformation Analysis of Cloth Hysteresis Model)

Figure 7:
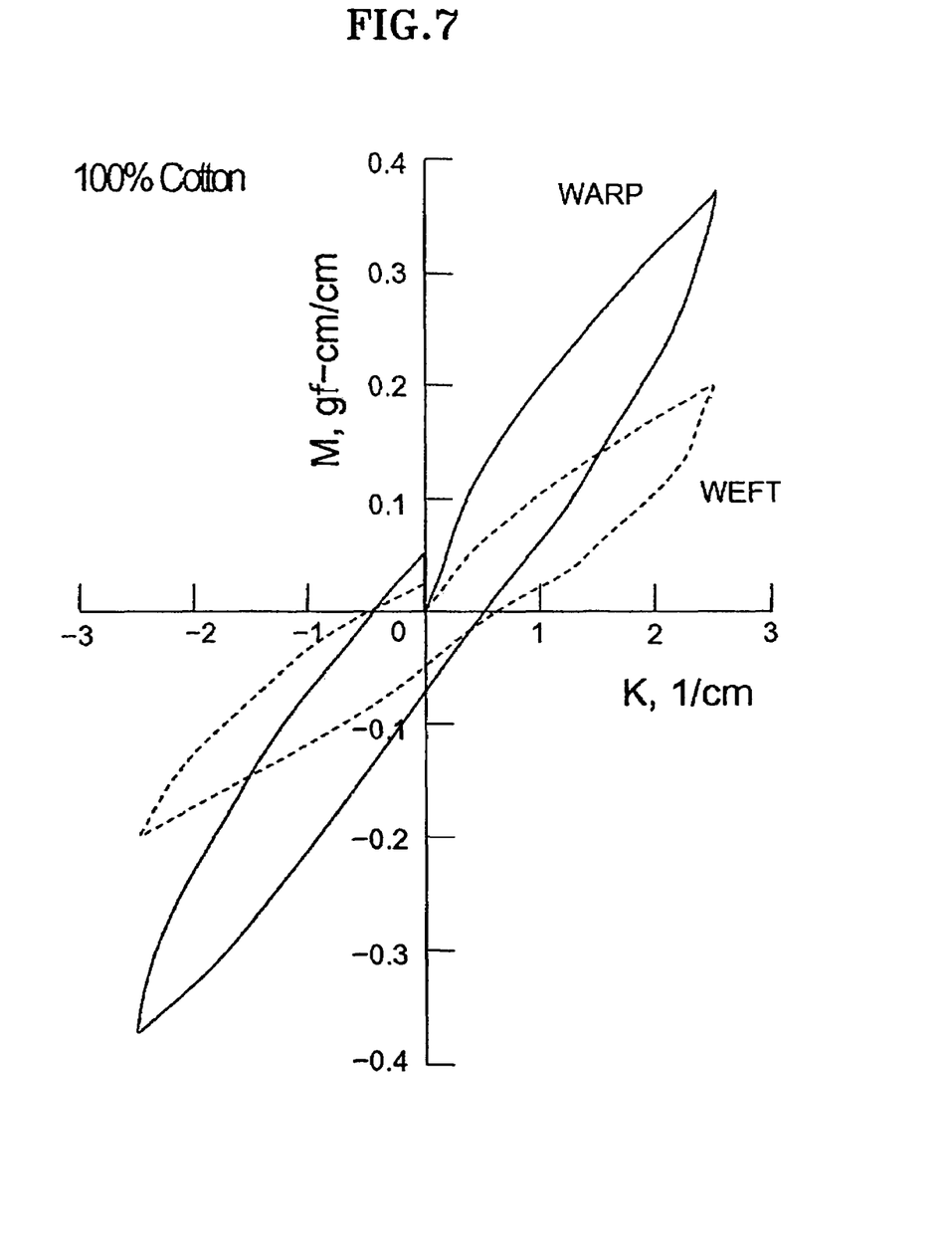
FIG. 7 is a graph for illustrating an actual hysteresis response curve measured on a pure cotton.

When the deformation energy is obtained in the aforementioned immediate buckling model, the curvature and the bending moments of the deformation units are assumed as being linear. Although this assumption can be well applied to such cloth as silk, other cloth materials such as cotton may not be applicable because it has a hysteresis phenomenon. FIG. 7 illustrates a pure cotton having hysteresis characteristics in relation with the bending moment and curvature.

Conventionally, hysteretic curves obtained by measurement were directly used to simulate the hysteresis characteristics of cloth. However, the hysteretic curves obtained by the measurement can be applied only to a case where the curve changes during measurement are identical to curve changes during simulation such that they are not generally appropriate to be applied to dynamic simulation. Therefore, it is desirable to make a physical model in order to simulate hysteresis characteristics of cloth.

Figure 8:
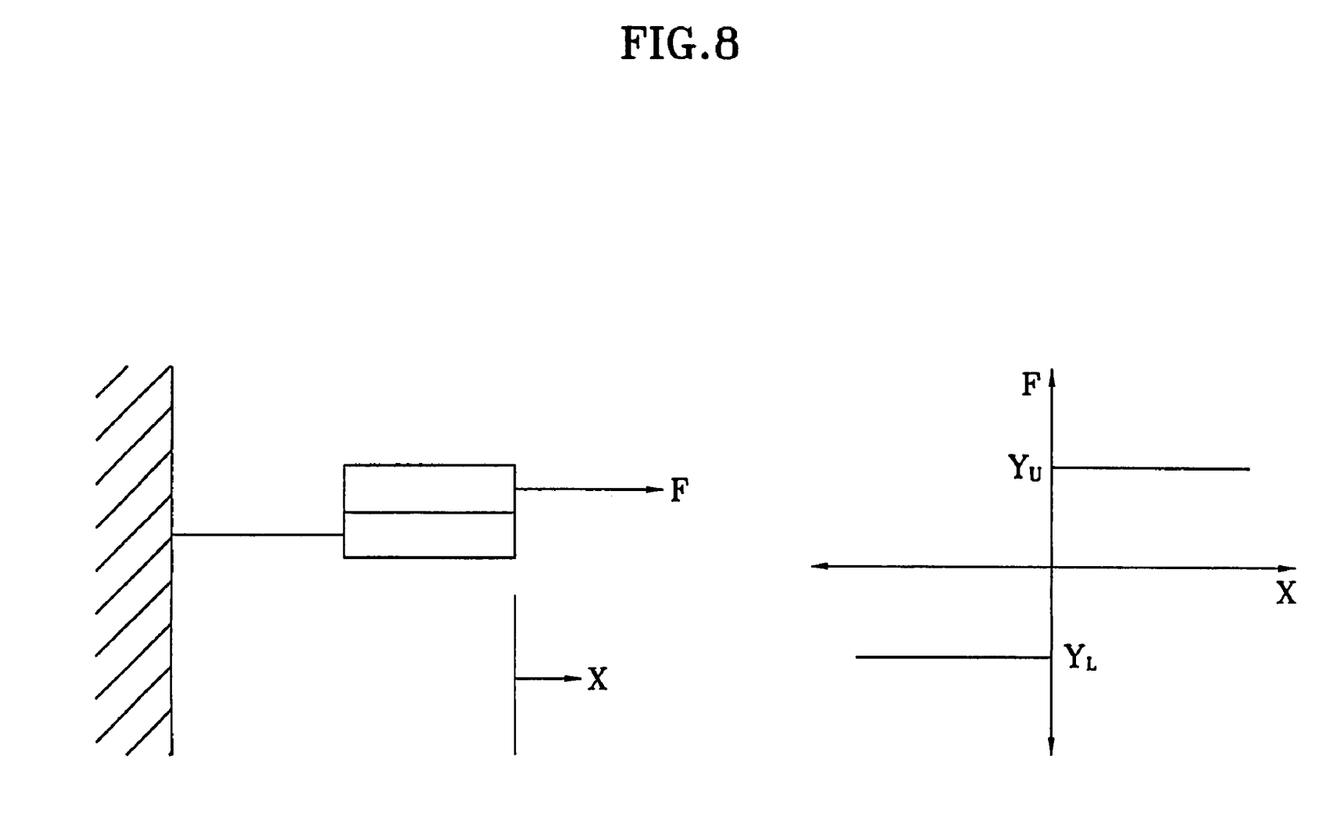
FIG. 8 is a graph for illustrating the construction of a slip unit and a response thereof.
Figure 9:
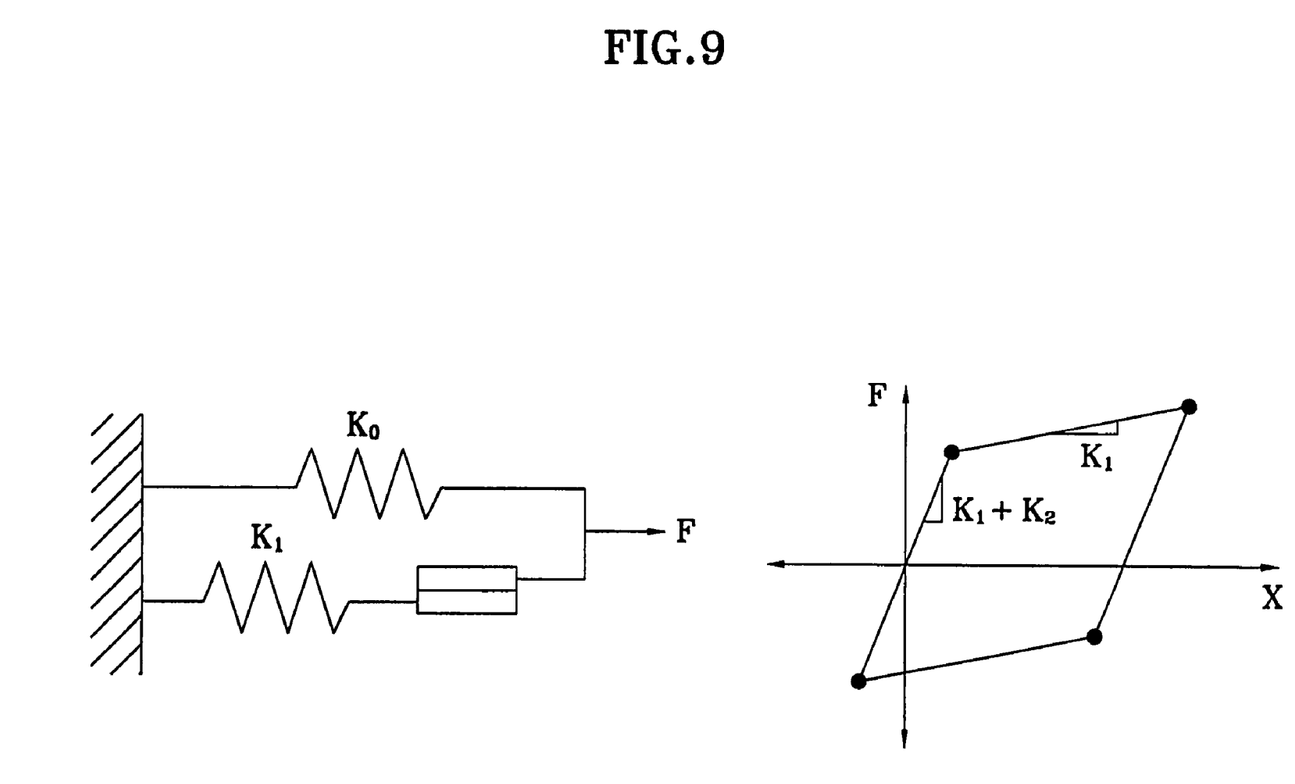
FIG. 9 is a schematic drawing for illustrating a construction that combines two springs and a slip unit, and a response thereof.

Meanwhile, generally hysteresis phenomenon is deeply involved with plasticity. In order to analyze the hysteresis phenomenon, it is widely known to use such hysteresis models as shown in FIGS. 8 and 9. FIG. 8 illustrates a slip unit having an ideal plasticity to depict a relationship between curvature (X) and moment (F). FIG. 9 illustrates a model in which springs and a slip unit are used to model a basic hysteresis characteristic. However, the model having the basic hysteresis characteristics shown in FIG. 9 is rather inappropriate to simulate an actual hysteresis characteristic of cloth as shown in FIG. 7.

Therefore, in order to simulate an intrinsic hysteresis characteristic of cloth (different from the basic hysteresis characteristic), it is necessary to use a hysteresis model that is appropriate to the cloth. In the present invention, a new hysteresis model is provided to simulate the actual hysteresis characteristics of the cloth as shown in FIG. 7.

Figure 10:
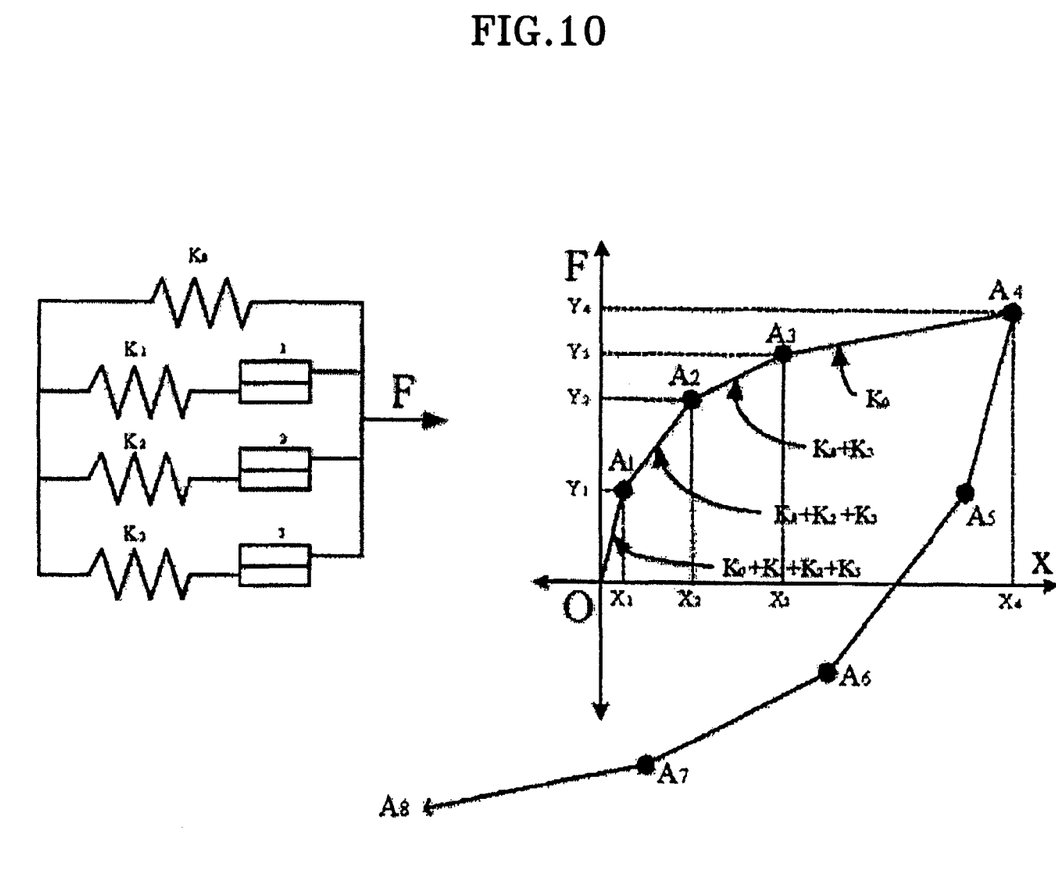
FIG. 10 is a schematic drawing of an embodiment of a construction that combines slip units and springs for modeling hysteresis characteristics of cloth according to the present invention, and a response thereof.

As an embodiment of the present invention, a model is illustrated in FIG. 10 wherein 4 springs and 3 slip units are connected. The entire responsive curve derived from the model is composed of finite straight lines, and the slopes of each finite straight lines are $K_o+K_1+K_2+K_3$, $K_o+K_2+K_3$, $K_o+K_3$ and $K_o$, respectively. A more generalized hysteresis model is composed of n+1 springs and n slip unit.

As illustrated in FIG. 10, when the moment is-reduced, the curve follows the lines of $A_4A_5, A_5A_6, A_6A_7, A_7A_8$. The lines of $A_4A_5, A_5A_6, A_6A_7$ and $A_7A_8$ are, parallel with $OA_1, A_1A_2$, $A_2A_3$ and $A_3A_4$, respectively, but the lengths of the lines $A_4A_5, A_5A_6, A_6A_7$ and $A_7A_8$ are twice the length of the lines of $OA_1$, $A_1A_2$, $A_2A_3$ and $A_3A_4$, respectively. Therefore, asymmetry occurs.

In the present invention, any hysteresis characteristic of a particular cloth can be expressed by adjusting the numbers of the slip units and springs, critical moments of each slip unit and constant values of each spring. As a result, the hysteresis characteristic of a particular cloth may be given as a function of moment M (K) against curvature K.

In order to apply the above-mentioned new hysteresis model to the bending deformation analysis of cloth, it is enough to substitute M in the equation 8 for the function M (K). Hereinafter, the above-identified hysteresis model is referred to as "Choi-Ko Discrete Hysteresis Model".

Figure 11:
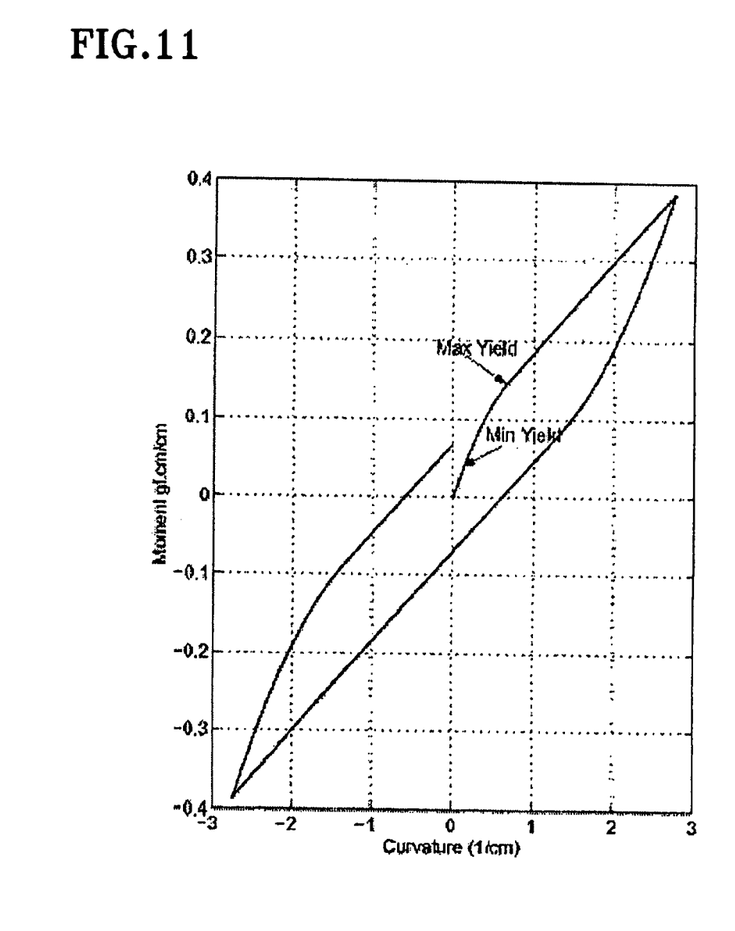
FIG. 11 is a schematic drawing of an embodiment of a construction combining infinite numbers of springs and slip units for modeling hysteresis characteristics of cloth according to the present invention, and a response thereof.

In FIG. 11, another embodiment of the present invention is illustrated which is identical to the finite hysteresis model except that 'n' is infinite. The curve derived from this model is smooth as shown in the right side of FIG. 11

This model is used in analyzing the hysteresis characteristics of cloth from a point where the plasticity deformation occurs to a point where the plasticity deformation ends (for example, between A1, A3 and A5, A7 shown in FIG. 10) as illustrated in FIG. 11.

In this case, when the yield limit of the slip unit which reaches the yield limit first is given as $\sigma_{min}$ and the yield limit of slip unit which reaches the yield limit last is given as $\sigma_{max}$, the yield limits of the infinite numbers of the slip units: are distributed between $[\sigma_{min}, \sigma_{max}]$. Additionally, it is assumed that the (infinitesimal) constants of all springs connected in a series with the-slip units are the same.

At this time, according to the descriptions of FIG. 10, when K is given as a total sum of the spring constants divided by the length of the portion where plasticity deformation occurs, as the change rate of the slope at the curve is constant, $$\frac{d}{dx}\left(\frac{dF}{dX}\right) = K. \tag{10}$$

In this case, if two conditions are given, the second order derivative corresponding to the curved portion at the hysteresis curve can be uniquely determined. Considering that the length of the lower portion of the curve is twice the length of the upper one, it can be modeled as $$\frac{d}{dx}\left(\frac{dF}{dX}\right) = 0.5 \text{ K}.$$

It should be noted that only the absolute value of the second order derivative corresponding to slip units exceeding the critical values becomes 0.5K, and for the slip units not yet exceeding the critical values the absolute value of the second order derivative should be K.

The curve illustrated at the right side of FIG. 11 is an embodiment of a hysteresis curve derived from the infinite hysteresis model of the present invention.

One of the strengths of the infinite hysteresis model is that, it can reduce storage for storing each condition of the slip units and can simulate the hysteresis characteristics more realistically in comparison with the finite hysteresis model. The infinite hysteresis model thus described is referred to as "Choi-Ko Continuous Hysteresis Model".

(Stretch Deformation Analysis of Cloth by Spring Model)

When stretching force is applied to cloth, the movement of cloth can be simulated by spring. models installed at two. extremities of a predetermined deformation unit of cloth. Stretching deformation energy accumulated on the predetermined deformation unit by the stretching force is obtained to simulate the movement of cloth in relation to the stretching. The stretching deformation energy can be derived from the following equation.

$$E = \begin{cases} \frac{1}{2}k_s(|x_{ij2}| - L_2)^2, & |x_{ij2}| \geq L_2 \\ 0, & |x_{ij2}| < L_2 \end{cases} \tag{10}$$

where $x_{ij2}$ is the distance between the two extremities of the predetermined deformation unit, $L_2$ is the distance where the stretching force is not applied, and Ks is a spring constant. In case of $|x_{ij2}| < L_2$, the deformation energy is 0, such that it should be noted that the above model can be applied to cases where stretching forces are applied among the extremities. In the above equation, the force acting on a certain position between the two extremities of the predetermined deformation unit can be expressed as follows in Equation 11:

$$f_i = \begin{cases} -\frac{dE}{dx_i} = k_s(|x_{ij2}| - L_2)\frac{x_{ij2}}{|x_{ij2}|}, & |x_{ij2}| \geq L_2 \\ 0, & |x_{ij}| < L_2 \end{cases} \tag{11}$$

Where, the force vector of the Jacobian matrix is given by Equation 12.

$$\frac{i}{j} = \begin{cases} s\frac{ij2\ ij2^T}{ij2^T\ ij2} + s\left(1 - \frac{b}{|ij2|}\right)\left(-\frac{ij2\ ij2^T}{ij2^T\ ij2}\right), & |ji2| \geq 2 \\ 0, & |ij2| < 0_2 \end{cases} \tag{12}$$

The first term of the above Jacobian matrix is derived from modeling the interaction as a linear spring and it indicates that the stiffness along the interacting direction by the stretching is constant. The second term of the Jacobian matrix indicates that the stiffness along the perpendicular direction of the interaction is proportionate to $$\left(1 - \frac{L_2}{|x_{ij2}|}\right)$$

direction. Since the cloth is shaped in a planar form, the perpendicular direction of the interaction corresponds to a direction perpendicular to the plane.

Because the spring model is applied only to a case where stretching force is applied, $|x_{ij2}|$ is larger than $L_2$, and $$\left(1 - \frac{L_2}{|x_{ij2}|}\right)$$

is positive but smaller than 1, thereby rendering the system stable. If the spring model is used in compression case, as $|x_{ij2}|$ approaches to 0, $$\left(1 - \frac{L_2}{|x_{ij2}|}\right)$$

diverges to infiniteness. Therefore, the entire system matrix $$\left(I - \alpha\frac{df}{dv} + \beta\frac{df}{dx}\right)$$

may generate a singularity problem regardless of the simulation step size. Therefore, the spring model is not used for compression in the present invention.

By way of reference, in the prior art [Volino and Magnenat-Thalmann 2000], the same spring models are used in both stretching and compression, and the second term of the Jacobian matrix in Equation 13 is dropped in both the stretching and compression. Furthermore, in order to avoid eigenvalues in the orthogonal direction of the interaction from becoming null due to the drop of the second term, a fictitious damping term is added. Although the added damping term can stabilize the system matrix, it may unnecessarily generate high resistance to the movement of the cloth.

As for compression in the present invention, an immediate buckling model is used which causes an instant bending deformation without contraction, while as for stretching, a spring model is used, such that stability of the system matrix can be obtained without adding an imaginary damping term. Therefore, the present invention can simulate the movement of cloth more realistically.

As apparent from the foregoing, there is an advantage in the immediate buckling model, hysteresis model, and simulation method based on the invented models and computer-readable media that stores the program which executes the invented simulation method thus described according to the present invention in that the immediate buckling model is used to simulate deformation caused by compressive forces, thereby solving the structural instability of the buckling phenomenon. Additionally, the simulation speed is increased. There is another advantage in that "Choi-Ko Discrete Hysteresis Model" and "Choi-Ko Continuous Hysteresis Model" are used to simulate the movement of cloth, thereby simulating the hysteresis characteristics more realistically.

While the invention has been described in terms of its preferred embodiments, the invention is illustrative and not restrictive thereto, and may be embodied in several forms without departing from the spirit or essential characteristics thereof, and it should be apparent that those skilled in the art will recognize with considerable modification within the spirit and scope of the appended claims.

What is claimed is:

1. A method of simulating a movement of cloth, the method comprising:
   a step of simulating, using a computer, an application of a compressive force to a cloth; and
   a step of simulating, using the computer, an immediate buckling of the cloth, said buckling simulating step including;
      estimating a bent shape of a deformation unit as a function of distance between two extremities of said deformation unit; and
      calculating an energy of bending deformation stored in said deformation unit by estimating the bent shape of the deformation unit;
      wherein the estimating the bent shape of the deformation unit includes: estimating a curvature of said deformation unit as a function of distance between two extremities of said deformation unit: and estimating the bent shape of the deformation unit from the estimated curvature;
   wherein the curvature is derived by:

$$K = \frac{2}{L_1} \operatorname{sinc}^{-1}\left(\frac{|x_{ij1}|}{L_1}\right)$$

K defines the curvature,
$X_{ij1}$ defines the distance between both distal ends of the deformation unit,
$L_1$ defines the distance between both distal ends of the deformation unit before the bent deformation occurs, and $$\operatorname{sinc}(x) = \frac{\sin x}{x}; \text{ and}$$

wherein the computer simulated movement of the cloth provides for a study of cloth wrinkles.

2. The method as defined in claim 1, the method further comprising the steps of: differentiating the bending deformation energy to obtain a force vector at the two extremities of the deformation unit; and obtaining a Jacobian matrix of the force vector, wherein the Jacobian matrix is an element for simulating the bending deformation of cloth and wherein terms having negative eigenvalues are dropped from the Jacobian matrix.

3. A computer-readable storage medium comprising computer-executable instructions to simulate a movement of cloth, that when executed by a computer perform the following steps of:
   a step of simulating an application of a compressive force to a cloth; and
   a step of simulating an immediate buckling of the cloth, said buckling simulating step including:
      estimating a bent shape of a deformation unit as a function of distance between two extremities of said deformation unit; and
      calculating a bending deformation energy stored in said deformation unit by estimating the bent shape of the deformation unit;
      wherein the estimating the bent shape of the deformation unit includes; estimating a curvature of said deformation unit as a function of distance between two extremities of said deformation unit; and estimating a shape of the bending deformation from the estimated curvature;
   wherein the curvature is derived by:

$$K = \frac{2}{L_1} \operatorname{sinc}^{-1}\left(\frac{|x_{ij1}|}{L_1}\right)$$

K defines the curvature.
$X_{ij1}$ defines the distance between both distal ends of the deformation unit,
$L_1$ defines the distance between both distal ends of the deformation unit before the bent deformation occurs, and $$\operatorname{sinc}(x) = \frac{\sin x}{x}; \text{ and}$$

wherein the computer simulated movement of the cloth provides for a study of cloth wrinkles.

4. The computer readable medium as defined in claim 3, the computer-executable instructions further comprising the steps of: differentiating the bending deformation energy to obtain a force vector at the two extremities of the deformation unit; and obtaining a Jacobian matrix of the force vector, wherein the Jacobian matrix is an element for simulating the bending deformation of cloth and wherein terms having negative eigenvalues are dropped from the Jacobian matrix.

* * * * *